May 18, 1926.
S. TAKACS
LAWN TRIMMER
Filed July 24, 1924.
1,585,572
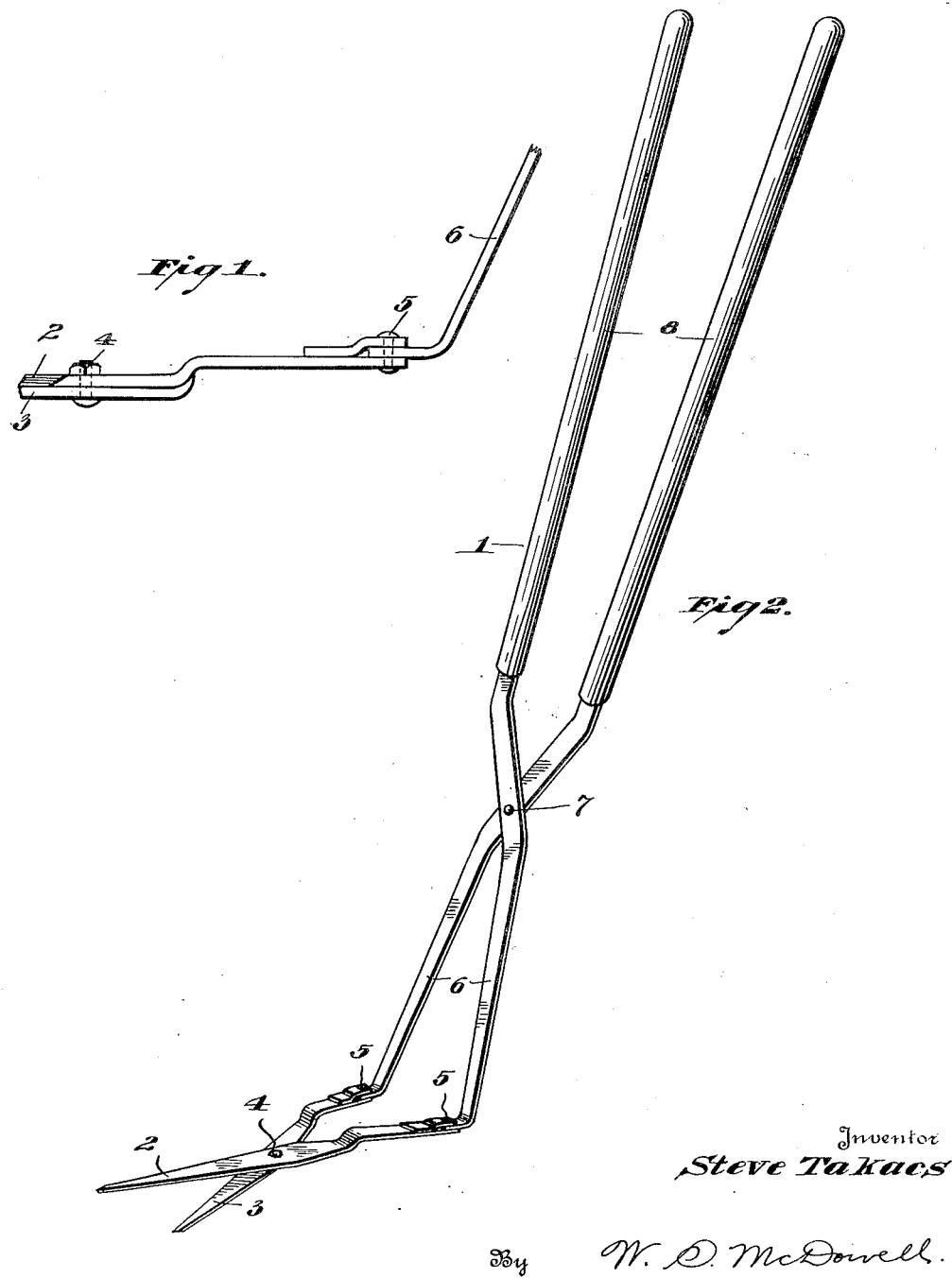
Inventor
Steve Takacs
By W. D. McDowell.
Attorney Patented May 18, 1926.

1,585,572

UNITED STATES PATENT OFFICE.

STEVE TAKACS, OF NEWARK, OHIO.

LAWN TRIMMER.

Application filed July 24, 1924. Serial No. 728,017.

This invention relates to improvements in lawn trimmers, and has for its primary object the provision of a simple, convenient and readily operated tool by means of which the edges of lawns and other inaccessible places may be kept in a neat and orderly condition, avoiding the necessity of using hand shears and other implements which are more or less laboriously operated in places where an ordinary lawn mower can not be operated to advantage.

With these and other objects in view, the invention generally consists in the provision of a grass trimmer which is constructed to embody a pair of pivotally related knife or shear elements which are adapted to be moved back and forth in cutting relation by means of a pair of pivotally connected elongated handles, the arrangement being such that the knife or cutting elements will be disposed to extend adjacent the ground on a substantially horizontal plane, while the pivoted actuating handles are arranged in a substantially vertical plane so that the operator, without bending or stooping over may manipulate the knives.

For a further understanding of the invention, reference is to be had to the accompanying drawings and the following description.

In said drawings:

Figure 1 is a perspective view of my improved lawn trimmer, and

Figure 2 is a detail sectional view disclosing the pivotal connection between the levers or operating handles and the movable knife elements.

Referring more particularly to the specific details of the invention the numeral 1 designates my improved lawn trimmer in its entirety. This trimmer preferably consists of a pair of pivoted cutting blades 2 and 3, which are joined together as at 4 so that the blades may move relatively in scissor fashion. To the rear of the pivot 4, the blades extend upwardly and outwardly in spaced relation and in a plane above that of the cutting edges of said blades. The extreme rear ends are pivotally connected as at 5 with the lower ends of a pair of operating levers 6. These levers extend upwardly in a substantially vertical direction, crossing each other to produce the pivotal connection 7. Above the connection 7 the levers are provided, preferably, with a pair of handles 8 adapted for the grasp of the operator.

From the foregoing it will be seen that the invention provides a simple, convenient and effective tool for trimming portions of the lawn or other grass growing areas which can not be reached readily with an ordinary lawn mower. It has been customary to employ short operating shears in the past to accomplish this trimming, but these shears are objectionable in that they are difficult to operate and further necessitate the kneeling or bending over of the operator to permit of their successful use. By the present invention these difficulties are avoided by reason of the shape, position and cooperation of the manipulating levers, which enable the operator while standing erect to manipulate the trimmer with the utmost ease and facility. Further, by reason of the elongated construction of the levers and the relation of the pivotal centers with respect to the cutting blades my trimmer may be operated with the least expenditure of manual effort.

What is claimed is:

A lawn trimmer comprising a pair of crossed cutting blades pivotally connected at their points of intersection, said blades being arranged in a horizontal plane. The blades in advance of the pivotal connection being provided with shear edges, the rear or actuating extremities of said blades being disposed in a horizontal plane above that of the forward or shear edges thereof, a pair of elongated operating levers extending upwardly at an angle to the cutting blades, said levers being pivotally connected to each other at a point intermediate of their lengths and provided above said pivotal point with operating handles, the lower ends of said levers being terminated in forwardly bent horizontally disposed lugs, brackets provided upon the operating ends of said cutting blades, and pivotal connecting means uniting said lugs, brackets and the rear extremities of said blades.

In testimony whereof I affix my signature.

STEVE TAKACS.